(12) United States Patent
Cazals

(10) Patent No.: US 8,196,861 B2
(45) Date of Patent: Jun. 12, 2012

(54) REAR PROPULSION SYSTEM WITH LATERAL AIR INLETS FOR AN AIRCRAFT WITH SUCH SYSTEM

(75) Inventor: Olivier Cazals, Daux (FR)

(73) Assignee: Airbus Operations SAS, Toulouse (FR)

( * ) Notice: Subject to any disclaimer, the term of this patent is extended or adjusted under 35 U.S.C. 154(b) by 556 days.

(21) Appl. No.: 12/393,645

(22) Filed: Feb. 26, 2009

(65) Prior Publication Data

US 2010/0044504 A1 Feb. 25, 2010

(51) Int. Cl.
*B64D 27/02* (2006.01)
(52) U.S. Cl. ........................................................ 244/58
(58) Field of Classification Search .................... 244/58, 244/53 B, 53 R
See application file for complete search history.

(56) References Cited

U.S. PATENT DOCUMENTS

| 3,449,891 | A | * | 6/1969 | Amelio et al. | 55/306 |
| 3,489,377 | A | * | 1/1970 | Wright et al. | 219/85.15 |
| 3,667,703 | A | * | 6/1972 | Boek | 244/53 B |
| 5,529,263 | A | | 6/1996 | Rudolph | |
| 7,461,814 | B2 | * | 12/2008 | Hein et al. | 244/53 B |
| 2006/0163425 | A1 | * | 7/2006 | Brown et al. | 244/53 B |
| 2006/0196993 | A1 | * | 9/2006 | Hein et al. | 244/53 B |

FOREIGN PATENT DOCUMENTS

FR 1 339 453 A 10/1963
GB 1 212 875 A 11/1970

\* cited by examiner

*Primary Examiner* — Troy Chambers
(74) *Attorney, Agent, or Firm* — Perman & Green, LLP

(57) ABSTRACT

A propulsive system for an aircraft including an auxiliary jet engine is integrated within a tail cone of a fuselage. Lateral air intakes include each one a scoop movable between a closed position and an opened position are associated with aerodynamic channels to supply with air the auxiliary jet engine. The aerodynamic channels meet at a common channel including a movable flap to balance air flows coming from the air intakes when the operation is not symmetrical.

7 Claims, 3 Drawing Sheets

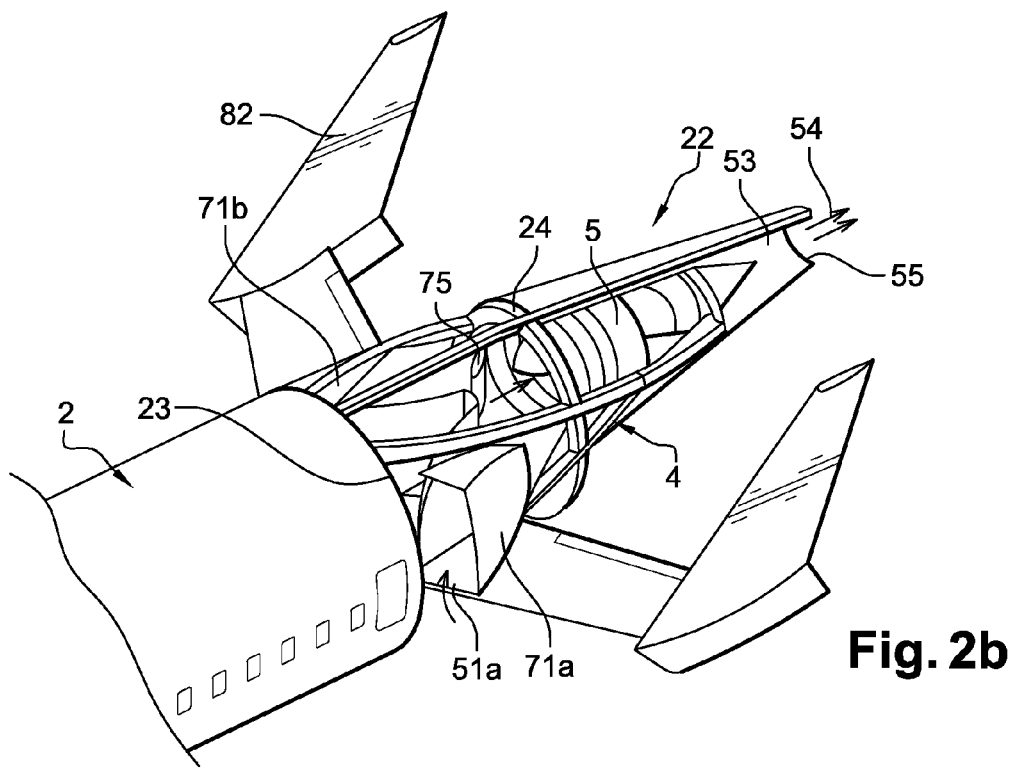
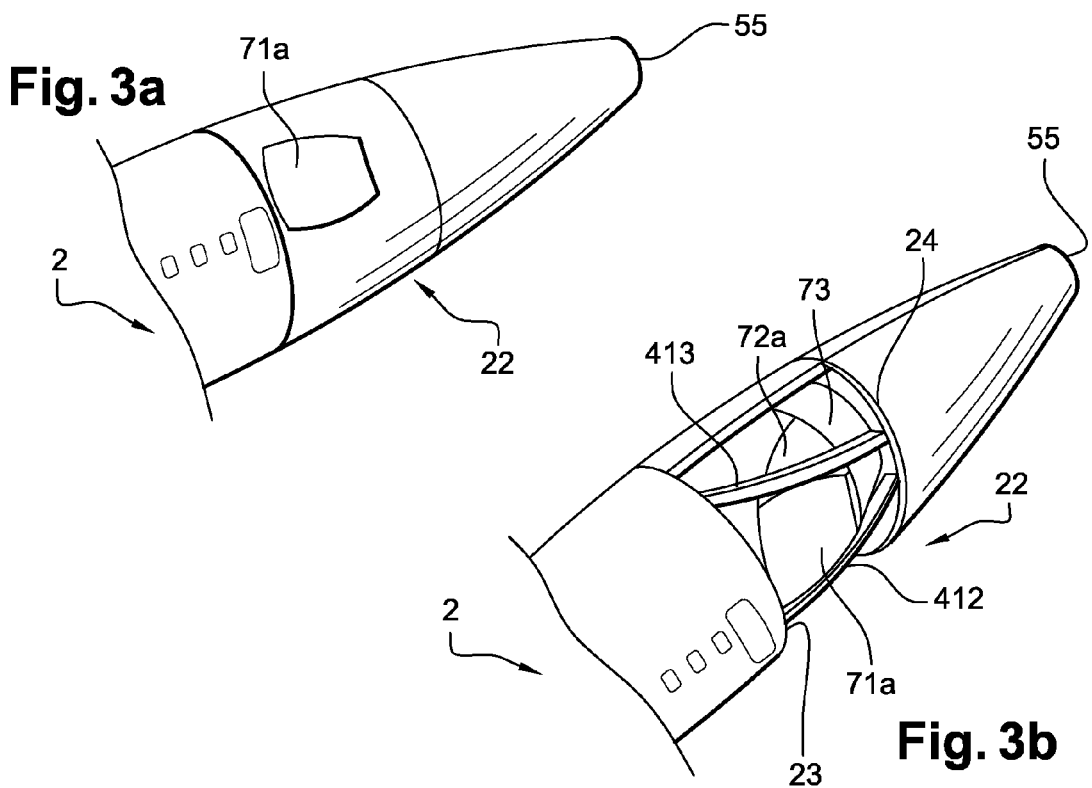

REAR PROPULSION SYSTEM WITH LATERAL AIR INLETS FOR AN AIRCRAFT WITH SUCH SYSTEM

CROSS-REFERENCE TO RELATED APPLICATIONS

This application claims priority to French Application No. 08 51344 filed on 29 Feb. 2008, the disclosure of which is incorporated by reference herein in its entirety.

BACKGROUND

1. Field

The disclosed embodiments generally relate to the field of aircraft powered by jet engines such as transport civil aircraft.

More particularly the disclosed embodiments relate to an aircraft including at least an engine installed into the fuselage tail section in order to be used only in certain running phases of the aircraft on the ground or in flight.

2. Brief Description of Related Developments

For safety reasons and in order to fulfill the certification lawful requirements, the transport aircraft comprise two or several engines in order to survive to engine failure cases during the various flying, takeoff, cruising or approach and landing phases.

While respecting the certification criteria and the operational constraints, the choice of the number and the characteristics of the engines is the result of compromises implying the desired, or required, performances of the aircraft in its various flying phases and in the various probable operating situations of the engines.

However, for industrial and operational reasons, the various engines of aircraft in commercial exploitation are of the same model which has advantages in the field of the engines maintenance but does not present necessarily an optimum in term of thrust balance, carried mass for the propulsion and aerodynamic drag.

Moreover, to ensure an autonomous production of energy, electricity, compressed air . . . , aboard of an aircraft in order to feed the various aircraft systems when the engines are stopped, on the ground before the startup of the engines, or in an exceptional way, in flight in the event of generations loss on the propulsive engines, the civil aircraft very frequently comprise an auxiliary power generator, generally designated by APU for Auxiliary Power Unit, dedicated to this service.

A drawback of the APU systems comes from the mass that they represent and which must be permanently transported mainly for a ground use.

A considered solution, presented in the U.S. Pat. No. 6,247,668, consists in using a particular jet engine to provide the functions of the APU when it is necessary to have an autonomous energy generation and to provide a complementary propulsion thrust when such a complementary thrust can prove to be useful or necessary.

The particular jet engine is not used when no additional energy or thrust source is necessary what makes it possible to maintain the particular jet engine at stop in order to optimize the fuel consumption.

The particular jet engine, designated by APTU, is fitted into the fuselage tail section, in the practice, approximately at the location of the majority of the APU on existing aircraft, so that it generates a thrust directed backwards of the aircraft.

An air intake to feed the APTU with a scoop shape on the top of the fuselage presents a closed position when the APTU jet engine is not running and this APTU jet engine has not necessarily a thrust identical to that of other ordinary propulsive engines.

However, this solution was never been implemented on an aircraft and, except using relatively small engines closer to a conventional APU than to a propulsive engine, many problems of mechanical installation and aerodynamic integration arise which are not solved today, particularly an air supply of the APTU which cannot be satisfactorily provided in all of the flying configurations.

SUMMARY

The disclosed embodiments propose an architecture of rear engine fitted within the fuselage of an aircraft in order to set up an auxiliary propulsive engine and incidentally an autonomous power generation group.

More particularly, the disclosed embodiments relate to a rear jet engine installation whose air intakes are adapted to the discontinuous operation of a jet engine within the back section of an aircraft fuselage which is completely contained into the envelope of the fuselage tail cone and which allows a reliable and optimal operation of the concerned jet engine without aerodynamic penalty for the aircraft when the engine is off.

According to the aspects of the disclosed embodiments the auxiliary propulsive system integrated into the fuselage tail cone of the aircraft includes an auxiliary jet engine, and is provided with a device for supplying external air to said jet engine.

To supply with air the auxiliary jet engine under good conditions whatever the flying incidences and the aerodynamic side slip angles of the aircraft, the device for supplying external air comprises two lateral air intakes on the fuselage sides, one on each side, ahead, according to the displacement direction of the flying aircraft, of the auxiliary jet engine.

In order not to generate aerodynamic penalty when the auxiliary jet engine is not in use, each lateral air intake is provided with closure means having a closed position in which the corresponding air intake is masked on the fuselage external surface, ensuring the continuity of this external surface, and at least an opened position in which the auxiliary jet engine is supplied with air via the corresponding air intake.

In order to compensate for the possible failure of the closure means of an air intake, preferably, each air intake includes at least an opened position which makes it possible to supply with air the auxiliary engine by only one air intake when the other air intake is closed.

To stabilize the air flow arriving at the auxiliary jet engine, advantageously each air intake, located ahead of the auxiliary jet engine, is continued by an aerodynamic channel and the aerodynamic channels of the air intakes meet to form a common channel up to a back frame located ahead of the auxiliary engine.

Each entry is advantageously equipped with a movable scoop that masks the air intake in a closed position and directs air into the corresponding aerodynamic channel in opened positions.

Moreover, to improve the flow conditions in the common channel when the operation of the lateral air intakes is not symmetrical, at least a flap movable around a substantially vertical axis is arranged into the common channel substantially on the fuselage centerline at the confluence area of the aerodynamic channels of the air intakes.

The various moving parts, movable scoops and flaps are regulated through the auxiliary jet engine management system according to parameters related to the operation of the auxiliary jet engine, to the operation of the air intake devices and to the aircraft flying conditions.

The disclosed embodiments advantageously relate to an aircraft comprising such a propulsive system, which auxiliary propulsive system makes it possible to optimize the size of the main propulsive engines of the aircraft and to set free from an auxiliary energy generation device APU penalizing, apart from operations primarily carried out on the ground.

BRIEF DESCRIPTION OF THE DRAWINGS

The auxiliary propulsive system according to the aspects of the disclosed embodiments is described with reference to the figures which schematically represent:

FIG. 2b: a perspective view partially cut-away of the rear part of the aircraft of FIG. 1 in the case of a non-symmetrical operation of the lateral air intakes;

FIG. 3a: a perspective view of the fuselage tail cone with a lateral air intake of the auxiliary jet engine in the closed position;

FIG. 3b: a view of the fuselage tail cone of FIG. 3 partially cut-away with the aerodynamic channels leading air of the air intakes towards the auxiliary jet engine;

DETAILED DESCRIPTION OF THE DISCLOSED EMBODIMENTS

Figure 1:
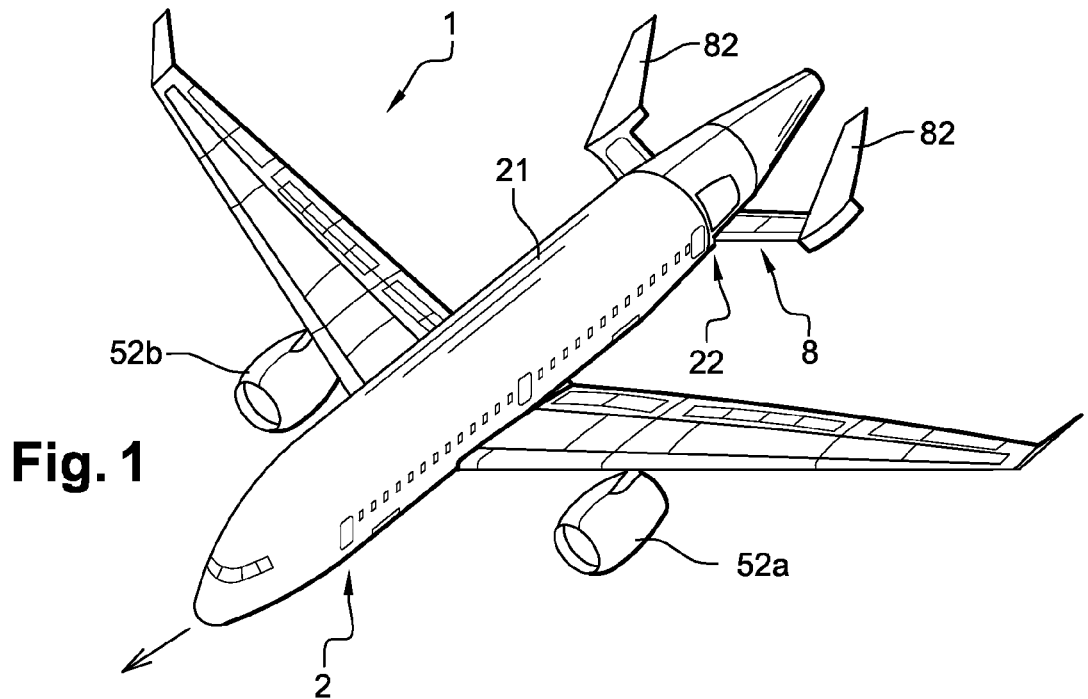
FIG. 1: a perspective view of an aircraft according to the disclosed embodiments in a cruising flight configuration.

On an aircraft 1, shown in FIG. 1, according to the aspects of the disclosed embodiments a fuselage 2, in a known way, comprises a substantially cylindrical central part 21 which is continued by a rear part 22 of the fuselage known as a tail cone, rearwards along the displacement direction (materialized by an arrow directed forwards on FIG. 1) of the aircraft during flight, whose sections decrease gradually from a section of the cylindrical part towards a final, relatively small, rear section.

In the description of the embodiments disclosed herein, it will be indicated by "front" and "rear" the aircraft forward direction along the flight displacement direction and respectively backward along the direction opposed to the flight displacement direction.

Figure 2A:
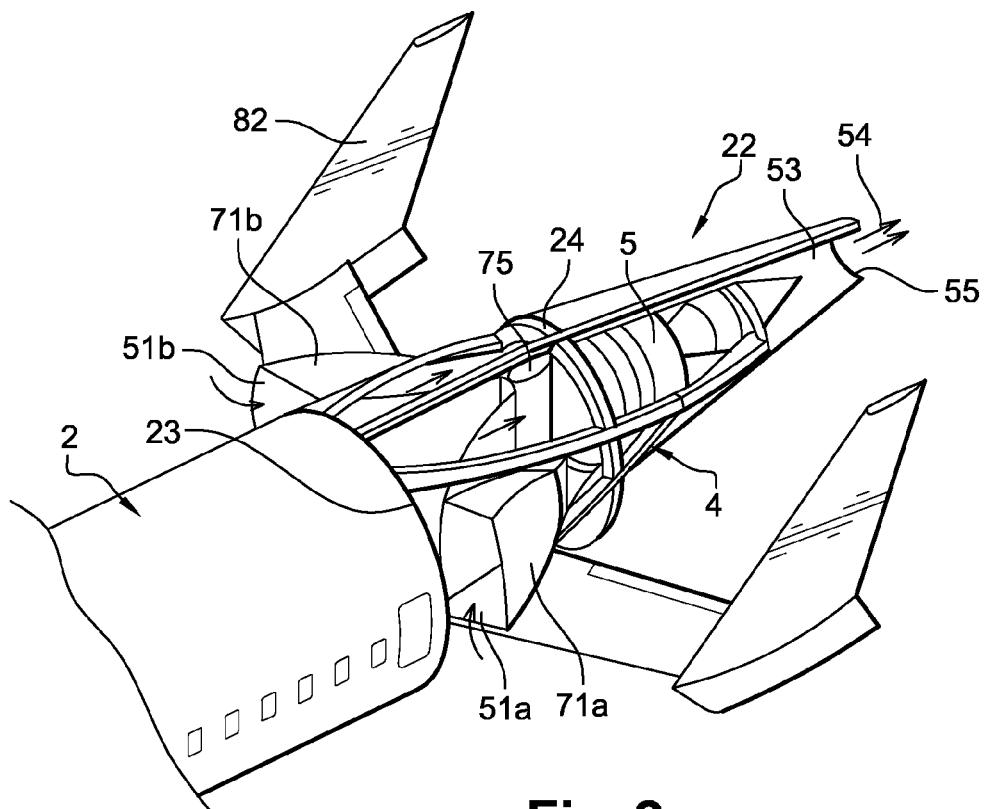
FIG. 2a a perspective view partially cut-away of the rear part of the aircraft of FIG. 1 in the case of a symmetrical operation of the lateral air intakes.

More particularly, in the auxiliary propulsive system according to the aspects of the disclosed embodiments, the final section corresponds to an exit section 55 of a nozzle 53 of an auxiliary jet engine 5 fixed within the tail cone 22 as illustrated on FIGS. 2a and 2b, said auxiliary jet engine being used as a propulsive engine in a first operating mode and if necessary as an energy generator in a second mode or in a mixed mode associating propulsion and energy generation.

The auxiliary jet engine 5 is maintained in a substantially axial direction relative to the fuselage 2, or in a thrust desired direction for particular conditions and which can be substantially moved away, particularly, to pitch down or to pitch up from the fuselage axial direction, by a carrying structure 4, formed from a beam assembly on which the auxiliary jet engine 5 itself is fixed.

Figure 3C:
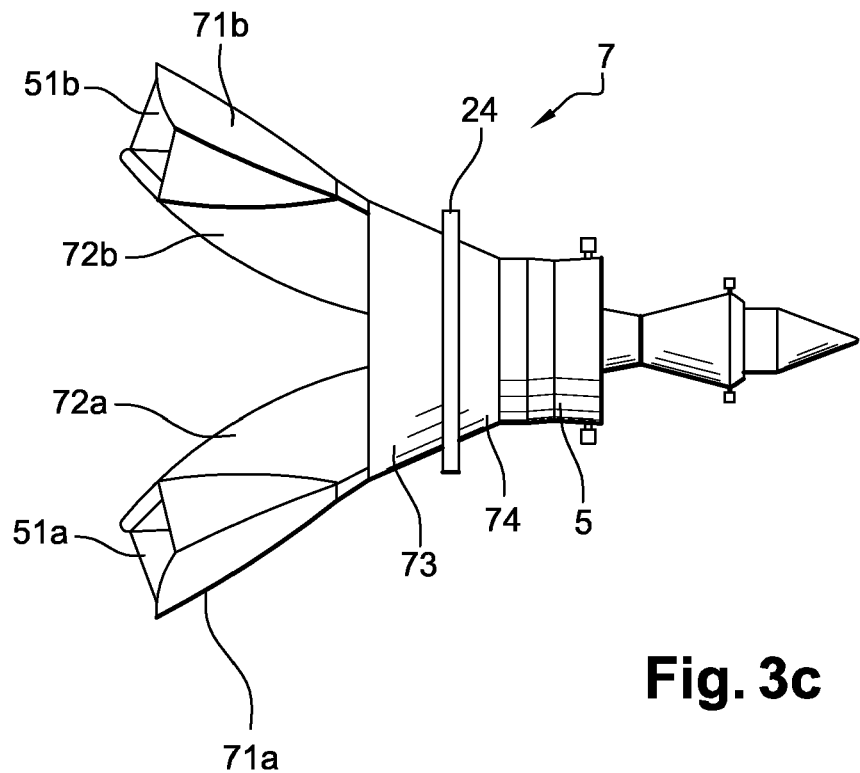
FIG. 3c: a top view illustrating the air intake device of the auxiliary jet engine without the structures of the fuselage and of the beam assembly.

The auxiliary jet engine 5 in fuselage 2 is associated to a device 7, illustrated on FIG. 3c without the fuselage structures, for supplying air in order to feed said engine.

The auxiliary jet engine 5, the carrying structure 4 and the air supplying device 7 form an auxiliary propelling assembly integrated into the tail cone 22 behind a load carrying frame 23 which corresponds, for example, to a sealed bottom of a pressurized cabin.

The air supplying device 7 includes lateral air intakes 51a, 51b each including closure means able to take at least two positions:

a position called a closed one illustrated on FIGS. 3a and 3b;

at least a position called an opened one, visible on FIGS. 2a and 3c.

The air supplying device 7 also includes an aerodynamic channel associated with each air intake 51a, 51b, respectively 72a, 72b, a channel 73 common with the air intakes in front of a rear frame 24 located ahead of the jet engine 5 and a connecting skirt 74 between the common channel 73 and an entry plane of the auxiliary jet engine 5.

In the closed position of the lateral air intakes 51a, 51b, the auxiliary jet engine 5 is not supplied with air. Said lateral air intakes are closed and the external surface of fuselage 2 corresponds substantially to a surface of the fuselage in the continuity of the fixed walls of said fuselage as FIGS. 1 and 3 illustrate it.

This closed position corresponds to periods during which the auxiliary jet engine 5 is not running.

In the opened position, movable components 71a, 71b shaped as scoops directed forward project on the sides of the fuselage 2 in front of the auxiliary jet engine 5 position and external air of the aerodynamic flow is guided towards the corresponding air intake.

The scoops 71a, 71b in opened positions are continued by the aerodynamic channels 72a, 72b which meet in front of the auxiliary jet engine 5 to form the common channel 73 and which feeds said jet engine with air.

The common channel 73 is interdependent at its rear end from the rear frame 24.

The air flow rate necessary for the auxiliary jet engine 5 being variable according to the operating point of said engine, particularly according to a rotation speed in the propulsion mode and a required power in the energy generation mode, advantageously the scoops 71a, 71b of the air intakes are adjustable in more or less opened positions by means of actuators, not represented, controlled by a management system of the auxiliary jet engine 5.

In order to compensate for a failure of a scoop 71a, 71b for supplying air, each scoop is preferably dimensioned to be able, in a sufficiently opened position, to supply alone the auxiliary jet engine 5 in its various operating modes, at least under degraded conditions. In this case at least a flap 75, on FIGS. 2a and 2b only one flap is represented, is arranged in a confluence area of the aerodynamic channels 72a, 72b for air supplying of the engine 5 to ensure a better homogeneity of the aerodynamic flow, according to the flow rates coming from the lateral air intakes 51a or 51b, into a entry plane of the engine 5.

The flap(s) 75, substantially vertical, is (are) in a median position when the aerodynamic flow in the aerodynamic channels 72a, 72b is balanced, substantially symmetrical, as in the case illustrated on FIG. 2a in which the two lateral air intakes 51a, 51b are operating, and the flaps 75 are oriented in a direction corresponding to the side of the failing air intake 51a or 51b in order to seal, at least partially, the aerodynamic channel 72a, respectively 72b, and to distribute the air coming from the operating air intake 51b, respectively 51a, into the entry plane of the auxiliary jet engine 5, as in the example shown in FIG. 2b in which an air intake 51a is operating and the other air intake 51b is not operating because of the scoop 71b remained closed.

In a modulated operating mode, the positions of the scoops 71a, 71b for air supplying are adjusted to the need of the auxiliary jet engine 5 according to its operating point and if necessary in a non-symmetrical way to take into account the non-symmetrical conditions of the aerodynamic flow along the fuselage, for example, if the aerodynamic side slip angle is not null.

Moreover, in the case of a non-symmetrical operation of the air intakes 51a, 51b, said air intakes being however both functional, the flap 75 is used to balance the flow into the common channel 73 by an adapted intermediate orientation.

In a not represented embodiment, the lateral air intakes are carried out without scoop by openings carried out on the surface of fuselage 2, for example, by NACA-type air intakes.

In this case, if this type of air intake is usable by taking into account the local characteristics of the aerodynamic flow on fuselage 2 and of the air requirement for the auxiliary jet engine 5, the openings of said NACA air intakes are advantageously closed by an internal shutter, for example, a sliding shutter, when the auxiliary engine is not used.

As shown in FIGS. 2a, 2b and 3b, each lateral air intake 51a, 51b is arranged not to be disturbed by the carrying structure 4.

In this lateral configuration of the air intakes 51a, 51b allowed by an adapted arrangement of the carrying structure 4 elements, particularly of the processes of the structure 412, 413 elements of said carrying structure, said air intakes are correctly fed with air for the various flying incidences of the aircraft 1 whereas air intake located on the top of the fuselage presents the drawback to be masked and within a very disturbed aerodynamic flow as soon as the fuselage presents an incidence angle relative to the upstream direction of the aerodynamic flow, the general case of the takeoff and reduced speed flying phases for which the use of auxiliary engine 5 is critical.

The aerodynamic flow in the aerodynamic channels 72a, 72b for air supplying is not disturbed by the presence of obstacles that structural beams would have constituted if said beams had crossed said channels, and the scoops 71a, 71b or other movables elements of the air intakes are advantageously placed between such structural beams.

Figure 4:
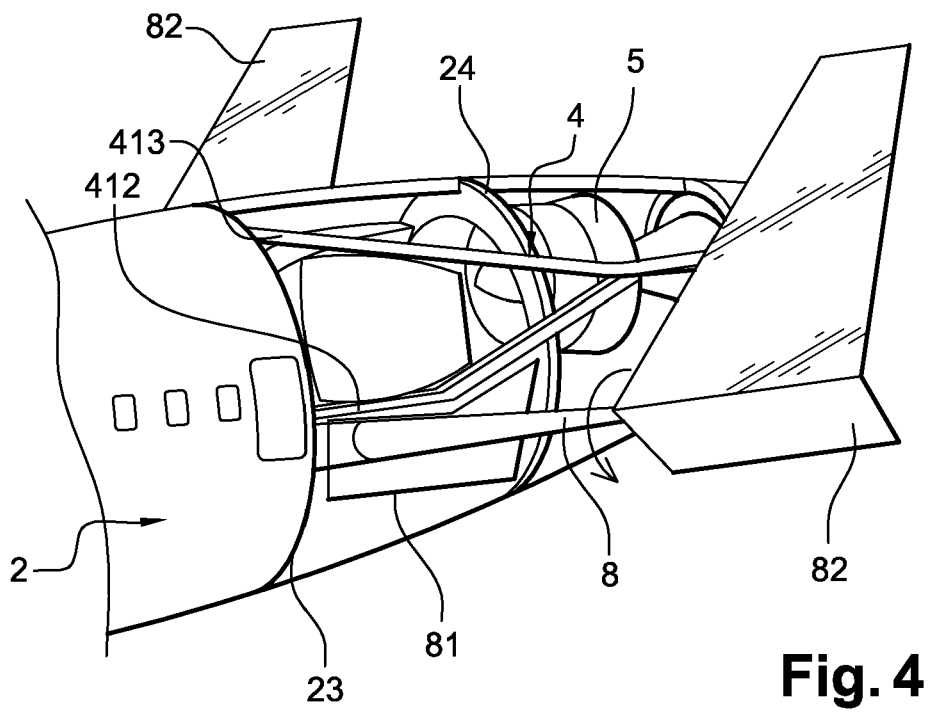
FIG. 4: a cut-away perspective view of the fuselage tail cone and of the empennages.

As illustrated on FIG. 4, the height position relative to fuselage 2 of carrying structure 4 elements between the rear load carrying frame 23 of fuselage and the rear frame 24 in front of the auxiliary engine 5, is such that a sufficient space within the fuselage is available under the elements of the carrying structure 4 for a crossing structure of an horizontal empennage 8 of aircraft 1, and if necessary has a space, materialized by a frame marked 81 on FIG. 4, necessary to the deflections of said empennage.

In such an arrangement, the horizontal empennage 8 and the associated crossing structure are placed in front of the auxiliary jet engine 5 and are apart from the bursting zones of said jet engine whose fragment would be likely to damage the empennage 8 and/or the control surfaces of this empennage.

Moreover, such an arrangement avoids the mechanical interferences between the lateral air intakes 51a, 51b and the mechanisms of the scoops 71a, 71b on the one hand and the horizontal empennage 8 and its crossing structure on the other hand.

In an advantageous way, as illustrated on the figures, vertical empennages 82 are fixed substantially at ends in span of the horizontal empennage 8 making a so-called H-shaped tail unit.

This empennage architecture also makes it possible not to introduce particular non-symmetrical efforts into the zone of the beams structure 4 on which the auxiliary jet engine 5 is fixed, which would be the case with a vertical fin in the vertical symmetry plane of the fuselage 2, which non-symmetrical efforts would be likely to deform the engine and to harm to its optimal operation.

The implementation of an architecture including an auxiliary jet engine 5 according to the aspects of the disclosed embodiments makes it possible to optimize the choice of the main propulsive engines, for example, of the jet engines 52a, 52b fixed under the wings as in the example of aircraft illustrated on FIG. 1, according to ordinary flying conditions and not to critical conditions under which the auxiliary jet engine 5 is operated.

The main propulsive engines 52a, 52b are thus of a reduced nominal thrust compared to the case of a design without auxiliary engine which has for effect to reduce the dimensions and the mass of said main jet engines and, by an induced effect, the noise level emitted by said jet engines.

The characteristics of the auxiliary jet engine 5 are then determined to answer to particular flying conditions requiring an available thrust higher than the thrust that may be provided by the main propulsive engines 52a, 52b.

For example the main propulsive engines 52a, 52b are determined, particularly with respect to the provided thrust, to optimize the flying conditions during the cruise and the auxiliary jet engine 5 is determined to bring the complementary thrust necessary in situations such as takeoff to answer to a requirement of an engine breakdown during this flying phase, or to constraints at the end of climb at a cruising altitude, or yet operational ceilings with one inoperative engine.

According to this architecture the auxiliary engine 5 is not necessarily identical to the main propulsive engines 52a, 52b and, in a general way, its nominal thrust is lower, but not necessarily, than that of said main jet engines.

The result is a less noisy aircraft 1 due to the fact that the total thrust installed for the phases of takeoff is lower than that obtained for a conventional design and due to the fact that the auxiliary jet engine 5 integrated into the fuselage 2 is itself less noisy because of its fitting.

Indeed, on the one hand the lateral air intakes 51a, 51b by their internal geometry authorize an effective acoustic treatment which limits the propagation of the noise emitted forwards by the fan and the arrangement of the jet engine into the fuselage tail cone 22 makes it possible to implement a long nozzle 53 at the rear outlet of the auxiliary jet engine 5, which long nozzle is favorable to a reduction of the noise emitted by the engine jet 54.

The disclosed embodiments make it possible to produce an aircraft optimized with respect to the propelling assembly including a jet engine integrated within the rear tail of the aircraft running only during flying phases where an additional thrust is necessary.

What is claimed is:

1. An auxiliary propulsive system for an aircraft, integrated within a tail cone of a fuselage, said propulsive system comprising an auxiliary jet engine and a device for supplying external air to said engine, said air supplying device including a lateral air intake on each one of the two sides of the fuselage ahead, along the displacement direction of the flying aircraft, of the auxiliary jet engine, in which air supplying device:

each lateral air intake is provided with closure means comprising a first position, called a closed position, where a continuity of an external surface of the fuselage is ensured, and at least a second position, called an opened position, where the auxiliary jet engine may be fed with air;

each lateral air intake is continued by an aerodynamic channel for supplying the auxiliary engine;

wherein the aerodynamic channels of the air intakes join to form a common channel behind, along the displacement direction of the flying aircraft, the lateral air intakes and in front of the auxiliary jet engine;

and wherein at least one flap, movable about a substantially vertical axis and substantially on the centerline of the fuselage is arranged in the common channel in a confluence area of the aerodynamic channels of the air intakes.

2. The propulsive system according to claim 1, wherein the closure means are adjustable in order to take, for each lateral air intake, more or less opened positions during the operation of the auxiliary jet engine, and wherein each of said lateral air intake comprises a sufficiently opened position of the closure means to allow the auxiliary jet engine to be fed with air, to ensure the operation of said auxiliary jet engine in a propulsive engine operating mode, by one air intake in an opened position when the other air intake is in a closed position.

3. The propulsive system according to claim 1 wherein a management system for the auxiliary jet engine adjusts by means of actuators the positions of the closure means of the air intakes and the position of the at least one flap according to at least one of operating parameters of the auxiliary jet engine, operating parameters of the closure means, and aircraft flying conditions.

4. Propulsive system according to claim 1 wherein each lateral air intake includes a closure means shaped as a scoop, said scoop being movable between a closed position where the air intake is masked on the external surface of the fuselage and at least an opened position where external air is directed towards the aerodynamic channel associated with said air intake.

5. The propulsive system according to claim 4, wherein the common channel is interdependent in a rear part of said common channel of a rear frame located within the tail cone ahead of the auxiliary jet engine.

6. An aircraft comprising a propulsive system according claim 1.

7. The propulsive system according to claim 3 wherein the aircraft flying conditions includes non-symmetrical conditions of the aerodynamic flow along the fuselage.

* * * * *

UNITED STATES PATENT AND TRADEMARK OFFICE
CERTIFICATE OF CORRECTION

| | | |
|---|---|---|
| PATENT NO. | : 8,196,861 B2 | Page 1 of 1 |
| APPLICATION NO. | : 12/393645 | |
| DATED | : June 12, 2012 | |
| INVENTOR(S) | : Olivier Cazals | |

It is certified that error appears in the above-identified patent and that said Letters Patent is hereby corrected as shown below:

Title page, Col. 1, item (30) Foreign Application Priority Data: insert
-- Feb. 29, 2008 (FR)   08 51344 --, therefor.

Signed and Sealed this
Thirty-first Day of July, 2012

David J. Kappos
*Director of the United States Patent and Trademark Office*